(12) United States Patent
Miyazaki

(10) Patent No.: US 8,947,463 B2
(45) Date of Patent: Feb. 3, 2015

(54) INFORMATION PROCESSING APPARATUS, INFORMATION PROCESSING METHOD, AND INFORMATION PROCESSING PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 868 days.

(21) Appl. No.: 12/755,890

(22) Filed: Apr. 7, 2010

(65) Prior Publication Data

US 2010/0283730 A1 Nov. 11, 2010

(30) Foreign Application Priority Data

Apr. 14, 2009 (JP) ................. P2009-098229

(51) Int. Cl.

| G06F 3/048 | (2013.01) |
|---|---|
| H04N 5/44 | (2011.01) |
| G06F 3/01 | (2006.01) |
| G06F 3/03 | (2006.01) |
| G06F 3/0484 | (2013.01) |
| G06F 3/0485 | (2013.01) |
| H04N 21/4223 | (2011.01) |
| H04N 21/431 | (2011.01) |
| H04N 21/4402 | (2011.01) |
| H04N 21/442 | (2011.01) |
| H04N 21/443 | (2011.01) |
| H04N 21/4728 | (2011.01) |

(52) U.S. Cl.
CPC .............. *H04N 5/4403* (2013.01); *G06F 3/017* (2013.01); *G06F 3/0304* (2013.01); *G06F 3/04845* (2013.01); *G06F 3/0485* (2013.01); *H04N 21/4223* (2013.01); *H04N 21/431* (2013.01); *H04N 21/440263* (2013.01); *H04N 21/44218* (2013.01); *H04N 21/4438* (2013.01); *H04N 21/4728* (2013.01)
USPC .......................................... 345/664; 345/655

(58) Field of Classification Search
CPC ............. G06F 2203/04806; G06F 2203/04803
See application file for complete search history.

(56) References Cited

U.S. PATENT DOCUMENTS

2006/0164382 A1 7/2006 Kulas
2006/0168523 A1 7/2006 Ikushi
(Continued)

FOREIGN PATENT DOCUMENTS

EP 1 840 522 A1 10/2007
JP 2006-209563 8/2006

*Primary Examiner* — Nicholas Lee
*Assistant Examiner* — Duane N Taylor, Jr.
(74) *Attorney, Agent, or Firm* — Finnegan, Henderson, Farabow, Garrett & Dunner, LLP

(57) ABSTRACT

An information processing apparatus include: a control detection block configured to detect a control in a predetermined detection space; a position detection block configured to detect a three-dimensional position of a control detected by the control detection block; a threshold value setting block configured, if the control has approached the control detection block beyond a threshold value set to a predetermined distance through the control detection block on the basis of a three-dimensional position detected by the position detection block, to set the threshold value farther from the control detection block than the predetermined distance; a setting change block configured, if the control has exceeded the threshold value set by the threshold value setting block, to change setting values for predetermined processing; and a processing execution block configured to execute the processing by use of the setting values set by the setting change block.

7 Claims, 13 Drawing Sheets

(56) References Cited

U.S. PATENT DOCUMENTS

2007/0070037 A1* 3/2007 Yoon .............................. 345/156
2008/0273755 A1 11/2008 Hildreth
2009/0244093 A1* 10/2009 Chen et al. ..................... 345/620
2010/0259610 A1* 10/2010 Petersen ........................ 348/142

* cited by examiner

G2

G1

G3

FIG.6A
PATTERN 1
FIG.6B
PATTERN 2
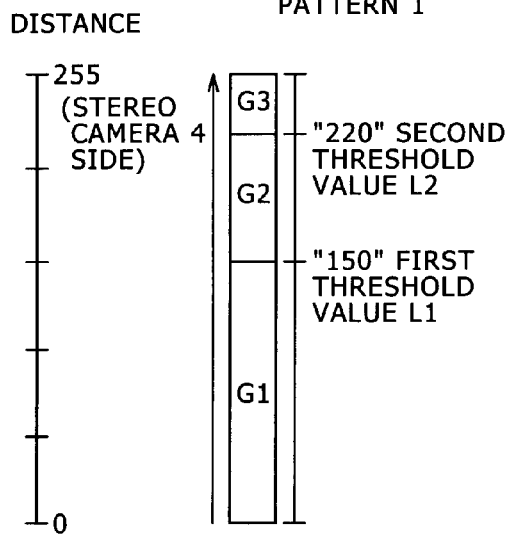
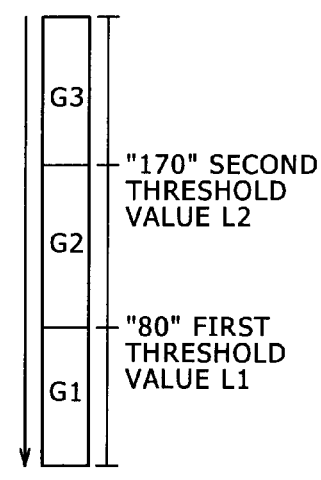

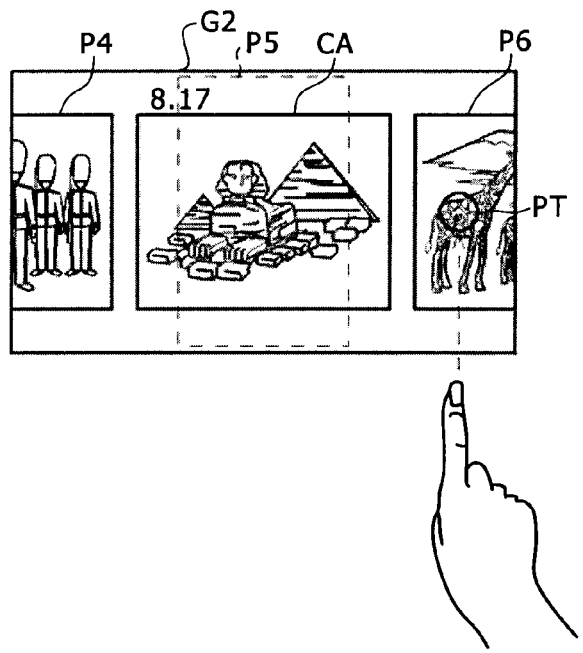
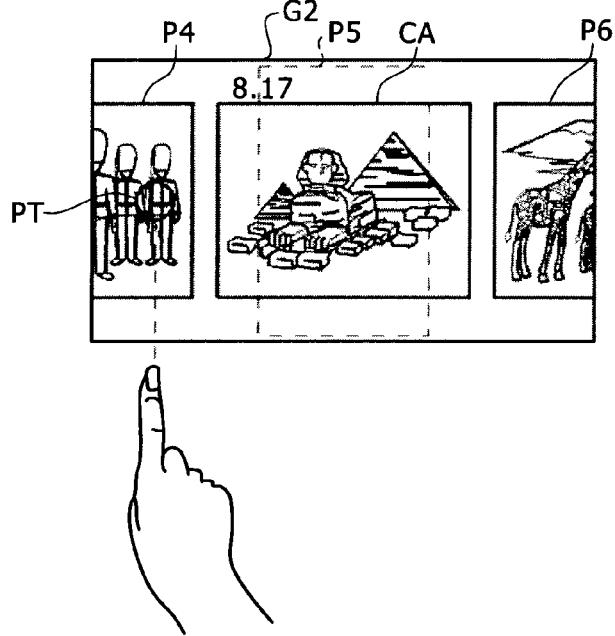

FIG.9
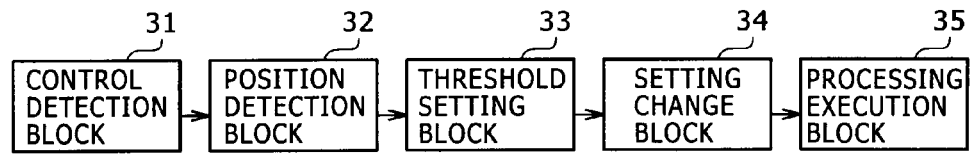
FIG.10A
PATTERN 3
FIG.10B
PATTERN 4
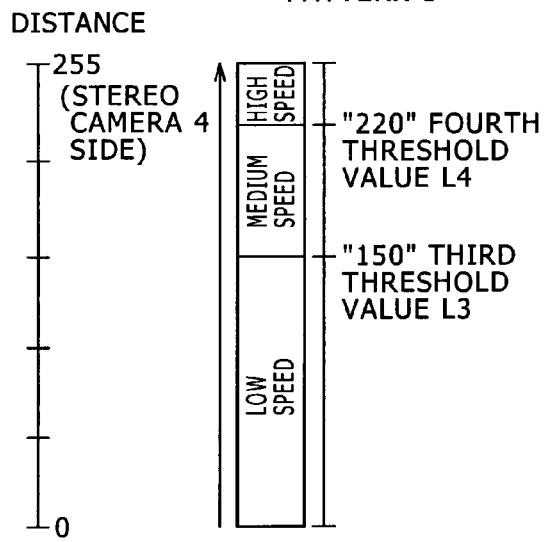
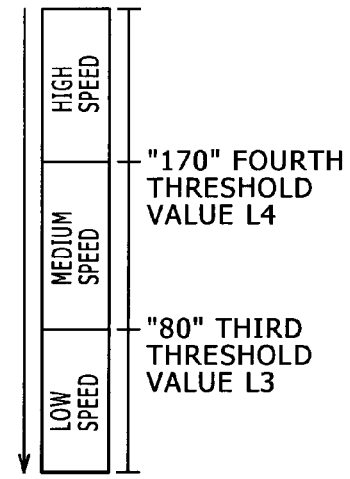

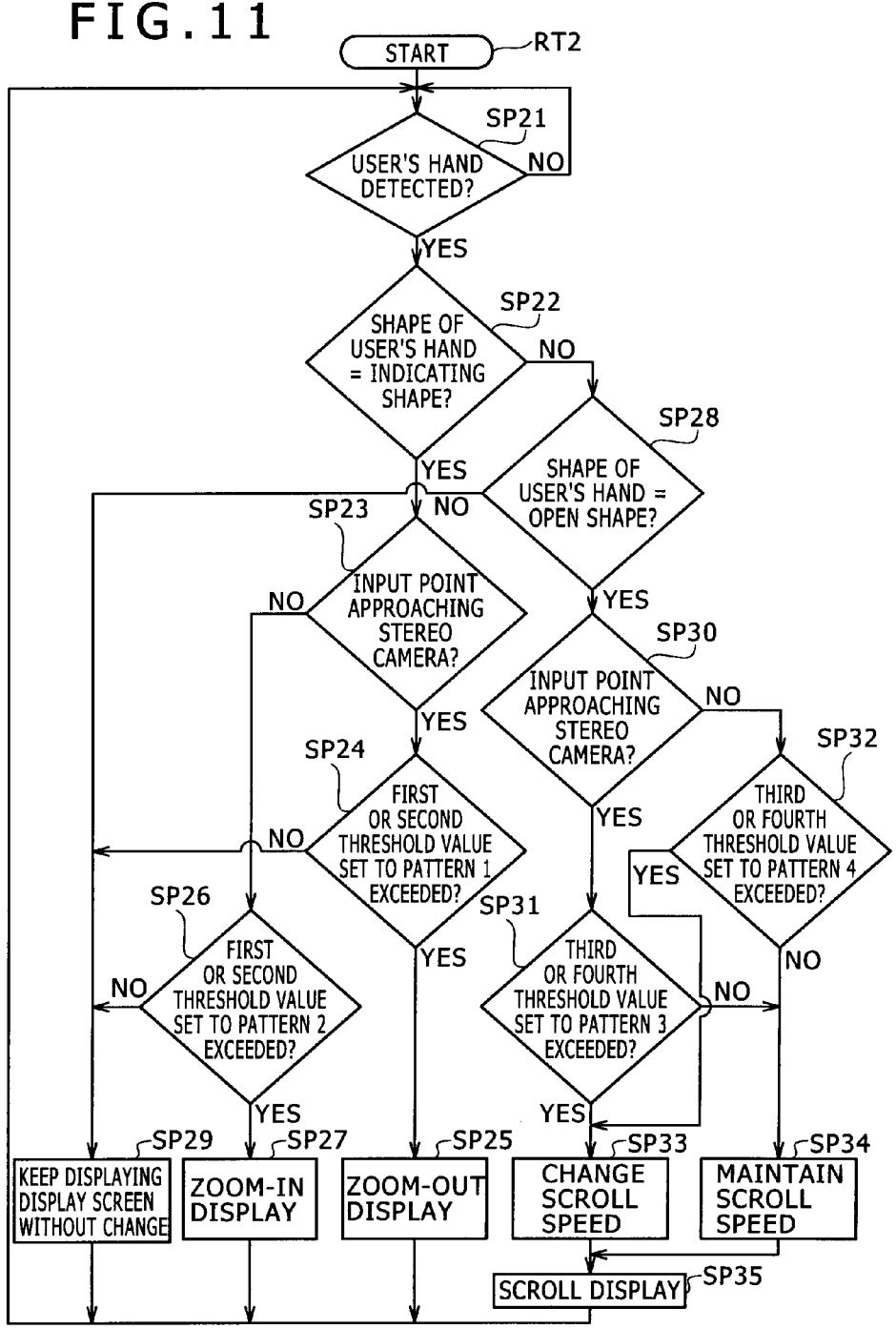

G4

G5

G6

INFORMATION PROCESSING APPARATUS, INFORMATION PROCESSING METHOD, AND INFORMATION PROCESSING PROGRAM

BACKGROUND OF THE INVENTION

1. Field of the Invention

The present invention relates to an information processing apparatus, an information processing method, and an information processing program and is suitably applicable to television receivers for example.

2. Description of the Related Art

Related-art television receivers are configured to receive signals specified by user operations done through a remote controller to execute processing corresponding to the received signals.

However, these television receivers require users to do complicated operations, such as finding necessary operator buttons from among many operator buttons arranged on a remote controller.

In order to overcome the above-mentioned problem, technologies are proposed, in which a display device arranged on a television receiver has a camera on the front side of the display device to take an image of three-dimensional movements of user's hand, for example, thereby executing the processing accordingly (refer to Japanese Patent Laid-open No. 2006-209563 for example).

SUMMARY OF THE INVENTION

The above-mentioned display device presents a problem that, the processing may be executed on the basis of settings not intended by the user, thereby lowering the ease of use of the display device because the user can grasp the distance between the user and the display device only approximately, especially in executing processing by setting different values in accordance with distances from the user to the display device.

Therefore, the present invention addresses the above-identified problem and solves the problem by providing an information processing apparatus, an information processing method, and an information processing program that are configured to enhance the ease of use of display devices.

In carrying out the invention and according to an embodiment thereof, there is provided an information processing apparatus. This apparatus includes a control detection block configured to detect a control in a predetermined detection space; and a position detection block configured to detect a three-dimensional position of a control detected by the control detection block. The apparatus further includes a threshold value setting block configured, if the control has approached the control detection block beyond a threshold value set to a predetermined distance through the control detection block on the basis of a three-dimensional position detected by the position detection block, to set the threshold value farther from the control detection block than the predetermined distance. The apparatus still further includes a setting change block configured, if the control has exceeded the threshold value set by the threshold value setting block, to change setting values for predetermined processing; and a processing execution block configured to execute the processing by use of the setting values set by the setting change block.

In carrying out the invention and according to the embodiment thereof, there is provided an information processing method. This method includes the steps of detecting a control in a predetermined detection space; and detecting a three-dimensional position of a control detected by the control detection step. The method further includes the step of setting, if the control has approached the control detection block beyond a threshold value set to a predetermined distance through the control detection block on the basis of a three-dimensional position detected by the position detection step, the threshold value farther from the control detection block than the predetermined distance. The method still further includes the steps of changing, if the control has exceeded the threshold value set by the threshold value setting step, setting values for predetermined processing; and executing the processing by use of the setting values set by the setting change step.

In carrying out the invention and according to the embodiment thereof, there is provided an information processing program. This program is configured to make a computer execute the steps of detecting a control in a predetermined detection space; and detecting a three-dimensional position of a control detected by the control detection step. Further, the program is configured to make a computer execute the step of setting, if the control has approached the control detection block beyond a threshold value set to a predetermined distance through the control detection block on the basis of a three-dimensional position detected by the position detection step, the threshold value farther from the control detection block than the predetermined distance. Still further, the program is configured to make a computer execute the steps of changing, if the control has exceeded the threshold value set by the threshold value setting step, setting values for predetermined processing; and executing the processing by use of the setting values set by the setting change step.

Consequently, if the user makes a control approach the control detection block beyond a threshold value, the threshold value is departed from the control detection block, so that, once the control exceeds the threshold value, it is difficult for the control to return over the threshold value, thereby preventing the easy change of setting values.

As described and according to the embodiment of the present invention, if the user makes a control approach the control detection block beyond a threshold value, the threshold value is departed from the control detection block, so that, once the control exceeds the threshold value, it is difficult for the control to return over the threshold value, thereby preventing the easy change of setting values. Consequently, an information processing apparatus, an information processing method, and an information processing program that are configured are able to enhance the ease of use.

BRIEF DESCRIPTION OF THE DRAWINGS

FIGS. 6A and 6B are diagrams illustrating zooming ratio threshold patterns;

FIGS. 7A and 7B are diagrams illustrating manners of scrolled display operations;

FIG. 9 is a block diagram illustrating an exemplary functional configuration of a television receiver;

FIGS. 10A and 10B are diagrams illustrating scroll speed threshold patterns;

FIG. 11 is a flowchart indicative of a screen display processing procedure in a second embodiment of the present invention.

DETAILED DESCRIPTION OF THE PREFERRED EMBODIMENTS

This invention will be described in further detail by way of embodiments thereof with reference to the accompanying drawings. It should be noted that the description will be made in the following order:

1. First embodiment
2. Second embodiment
3. Other embodiments

Figure 1:
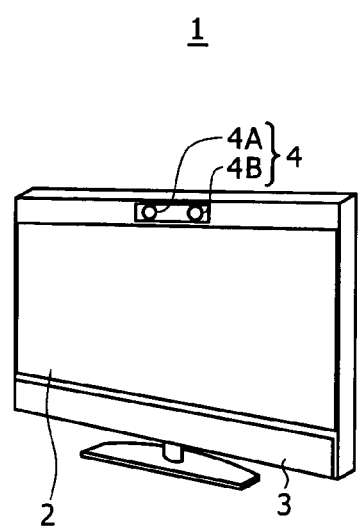
FIG. 1 is a perspective view of an exemplary external configuration of a television receiver.

1. First Embodiment 1-1. Exemplary External Configuration of Television Receiver As shown in FIG. 1, a television receiver 1 as an information processing apparatus associated with an embodiment of the present invention has a display 2 based on an LCD (Liquid Crystal Display), an organic EL (Electro-Luminescence), or the like, and a loudspeaker 3 lower of the display 2.

In addition, the television receiver 1 has a stereo camera 4 composed of cameras 4A and 4B upper of the display 2. The stereo camera 4 takes an image of a space in front of the display 2.

1-2. Circuit Configuration of Television Receiver

Figure 2:
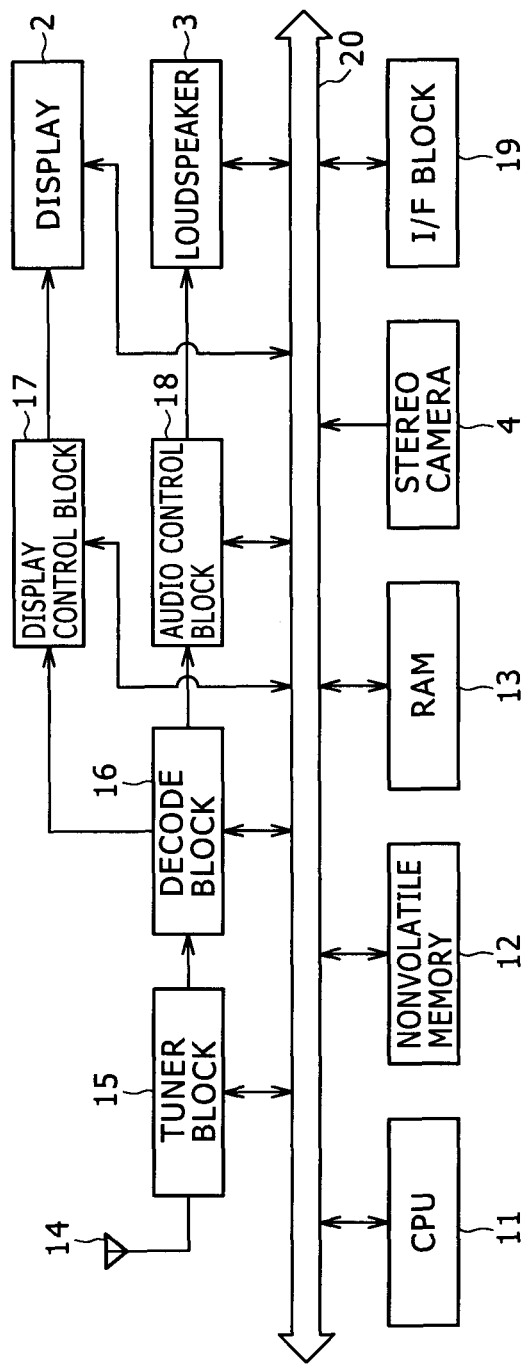
FIG. 2 is a schematic diagram illustrating an exemplary circuit configuration of a television receiver.

As shown in FIG. 2, with the television receiver 1, a CPU (Central Processing Unit) 11 reads a basic program stored in a nonvolatile memory 12 and extends this basic program into a RAM (Random Access Memory) 13. This allows the CPU 11 to overall control the entire television receiver 1 via a bus 20 as instructed by the basic program.

Also, the CPU 11 reads various application programs stored in the nonvolatile memory 12 and loads the read application programs into the RAM 13 for execution, thereby realizing various functions.

The CPU 11, when executing reception display processing of a television broadcast program, makes the television receiver 1 receive, at a tuner block 15, a broadcast signal of ground digital broadcasting received via an antenna 14.

The tuner block 15 extracts a television tuning signal corresponding to a predetermined broadcast channel from the received broadcast signal and transmits the extracted television tuning signal to a decode block 16.

The decode block 16 decodes the television tuning signal supplied from the tuner block 15 to get audio data and video data, transmitting the video data to a display control block 17 and the audio data to an audio control block 18.

The display control block 17 displays video corresponding to the video data supplied from the decode block 16 onto the display 2. The audio control block 18 outputs sound corresponding to the audio data supplied from the decode block 16 to the outside through the loudspeaker 3.

Further, the television receiver 1 has an I/F block 19. When a digital still camera for example is connected to the I/F block 19 via a predetermined communication path and image data is supplied to the television receiver 1, the television receiver 1 stores the supplied image data in the nonvolatile memory 12.

Then, the CPU 11 reads the image data from the nonvolatile memory 12 in accordance with an operation for displaying the image data stored in the nonvolatile memory 12, to be more specific, the CPU 11 executes image display processing to be described later, transmitting this image data to the display control block 17. The display control block 17 displays an image based on the image data supplied by the CPU 11 onto the display 2.

It should be noted that the image data is compliant with the EXIF (Exchangeable Image File Format) standard and is stored with such additional information as image taking date and thumbnail images. Therefore, the television receiver 1 displays an image taking date of an image shown in the display 2 along with this image in accordance with a user operation, for example.

The stereo camera 4 takes an image of the space in front of the display 2 at a predetermined interval through the cameras 4A and 4B and transmits resultant video data to the CPU 11.

The CPU 11 detects a movement of user's hand (hereafter referred to also as a gesture) from the video data supplied from the stereo camera 4, thereby executing processing corresponding to the gesture.

To be more specific, the CPU 11, at every predetermined timing, gets the video data respectively taken by the cameras 4A and 4B of the stereo camera 4 as time passes.

Then, of the image data obtained from the stereo camera 4, the CPU 11 executes flesh color extraction processing on the image data taken by the camera 4A for example. In this flesh color extraction processing, a flesh color is determined on the basis of the hue of each pixel of video data, thereby extracting a flesh color part displayed in the video data.

For example, if no flesh color part is detected by executing the flesh color extraction processing on video data, the CPU 11 determines that the user has not been doing a gesture operation.

Next, if a flesh color part is found in video data, the CPU 11 extracts a pixel having the highest luminance level from among the pixels corresponding to this flesh color part as an input point.

If the user moves his index finger for example in front of the display 2, the CPU 11 extracts the pixel having the highest luminance level from the flesh color part, thereby extracting the pixel corresponding to the tip of the index finger nearest to the display 2 as an input point.

Next, the CPU 11 detects a planar position of the input point from an image range of the video data taken by the camera 4A, thereby detecting the position of the input point on a plane that is parallel to the display 2.

In addition, the CPU 11 computes a distance from the stereo camera 4 to the input point in the direction vertical to the display 2 by use of the video data taken by the cameras 4A and 4B, respectively, by a stereo method for example. At this moment, in accordance with the performance of the stereo camera 4, in a detection range of approximately 80 to 120 cm for example, the CPU 11 is able to compute the distance from the stereo camera 4 to the input point.

At this moment, the CPU 11 divides the detection range into 256 steps (0 to 255) and detects the distance from the stereo camera 4 to the input point detected by the stereo method in any one of the 256 steps. For example, with these 256 steps, a position nearest to the stereo camera 4 is defined as "255" and a position farthest from the stereo camera 4 is defined as "0."

Therefore, by detecting the position of the input point on a plane parallel to the display 2 and the distance from the stereo camera 4, the CPU 11 detects a three-dimensional position of the input point.

Then, every time the CPU 11 gets video data taken by the cameras 4A and 4B of the stereo camera 4, respectively, the CPU 11 detects an input point and, at the same time, a three-dimensional position of this input point, thereby detecting a change in this three-dimensional position as a gesture. Next, the CPU 11 executes processing in accordance with the detected gesture.

For example, on the basis of the three-dimensional position of each input point, the CPU 11 displays, in a translucent circular pointer PT (refer to FIGS. 5 and 7) for example, the position of the display 2 pointed by the user's hand, thereby letting the user visually check this position.

1-3. Image Display Processing

The following describes image display processing for displaying image data stored in the nonvolatile memory 12 onto the display 2 in accordance with gestures.

Figure 3:
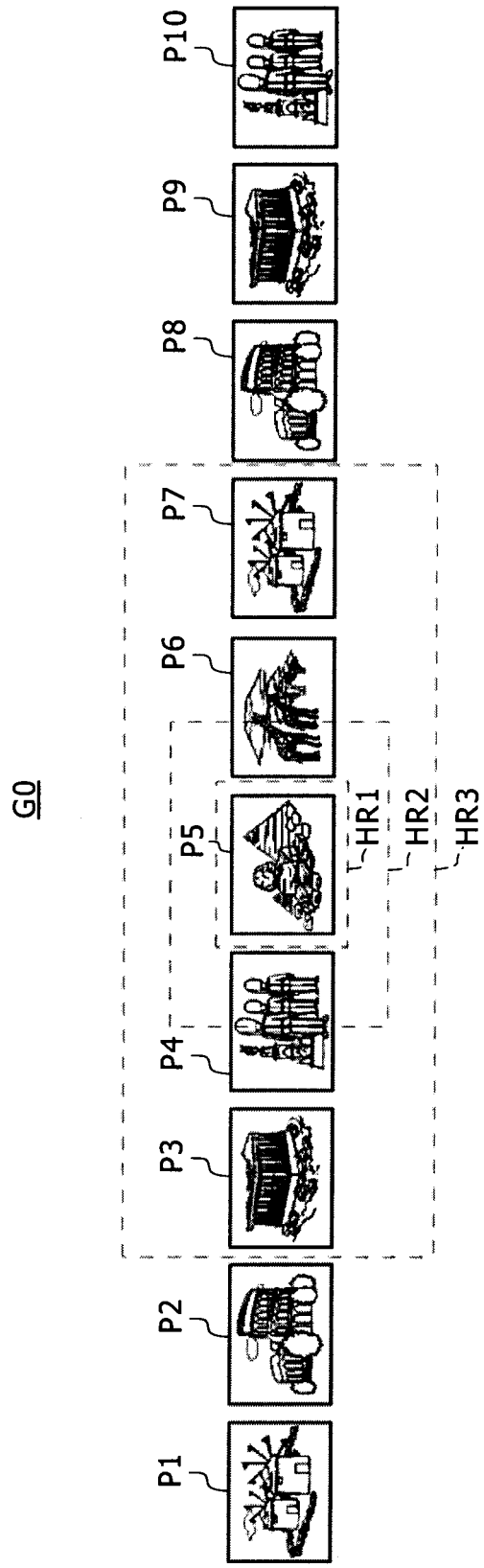
FIG. 3 is a diagram illustrating a list display screen.

Executing image display processing, the CPU 11 reads image data stored in the nonvolatile memory 12. Next, as shown in FIG. 3, on the basis of the image taking date of image data, the CPU 11 generates a list display screen G0, in which images P1 through P10 based on 10 sheets of image data for example of the read image data are arranged in a row from left to right in the order of image taking dates at predetermined intervals. It should be noted that, unless otherwise specified, the images P1 through P10 are generically referred to as simply image P.

Figure 4B:
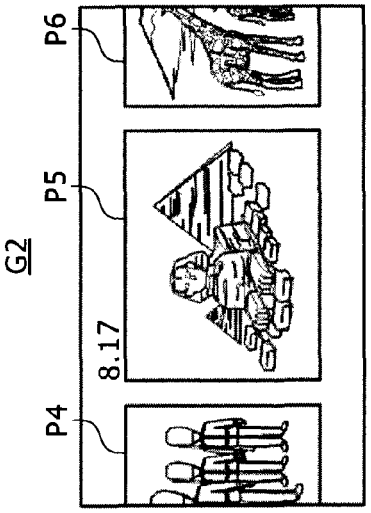
FIGS. 4A, 4B and 4C are diagrams illustrating exemplary display screen configurations at different zooming ratios.
Figure 4A:
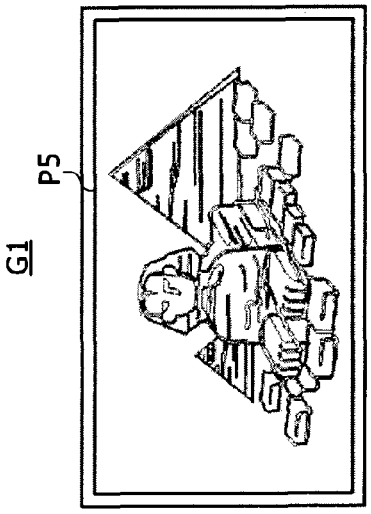

Then, the CPU 11 sets a display area HR1 on the list display screen G0 so as to display image P5 for example in a full view manner, thereby displaying display screen G1 corresponding to this display area HR1 onto the display 2 as shown in FIG. 4A.

Next, every time the CPU 11 gets image data taken by the cameras 4A and 4B of the stereo camera 4, respectively, the CPU 11 executes the flesh color processing on the obtained image data as described above, thereby detecting a pixel having the highest luminance level in a resultant flesh color part as an input point.

Also, the CPU 11 detects the position of the detected input point on a plane parallel to the display 2 and the distance from the stereo camera 4 to the input point as a three-dimensional position.

Figure 5:
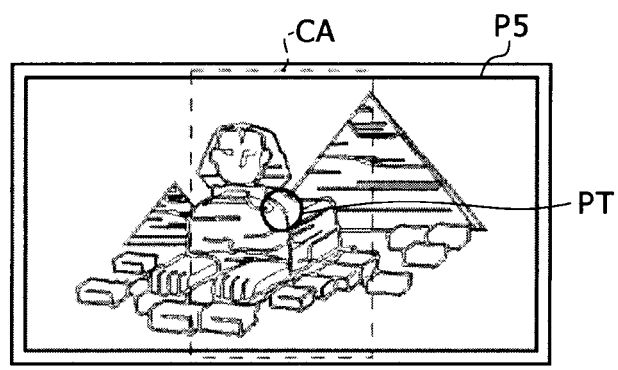
FIG. 5 is a diagram illustrating a manner in which a center area is selected.

At this moment, if the user points at approximately the center of the display 2, namely, the pointer PT is located inside a center area CA, as shown in FIG. 5, the CPU 11 executes zoom display in which the list display screen G0 is displayed on the display 2 in three different zooming ratios.

To be more specific, if the pointer PT is found inside the center area CA on the basis of the three-dimensional position of the input point, the CPU 11 obtains a difference between the distances of input point continuously detected in the preceding and succeeding positions, thereby determining whether this input point is approaching or departing from the stereo camera 4.

Then, if the input point is found approaching the stereo camera 4, the CPU 11 sets first threshold value L1 and second threshold value L2 for changing zooming ratios to "150" and "220," for example, as shown in FIG. 6A. It should be noted that the first threshold value L1 and the second threshold value L2 are stored in the nonvolatile memory 12 and read by the CPU 11 for setting.

If the input point gets close to the stereo camera 4 beyond "150" that is the first threshold value L1, the CPU 11 sets a display area HR2 that is zoomed out from the display area HR1 to the list display screen G0 (refer to FIG. 3).

Then, the CPU 11 displays a display screen G2 corresponding to the display area HR2 onto the display 2 as shown in FIG. 4B. For this display screen G2, a date on which image P for example was taken is displayed in a margin of the display screen G2.

Also, if the input point is found getting close to the stereo camera 4 beyond "220" that is the second threshold value L2, the CPU 11 sets a display area HR3 that is further zoomed out from the display area HR2 to the list display screen G0.

Figure 4C:
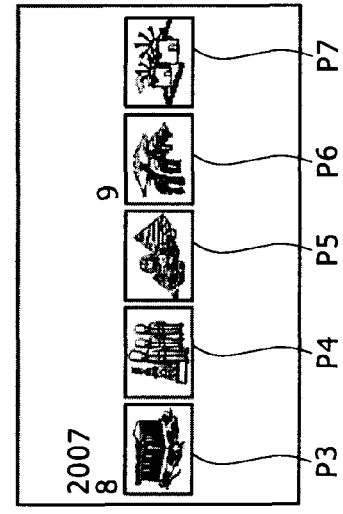

Next, the CPU 11 displays the display screen G3 corresponding to the display area HR3 on the display 2 as shown in FIG. 4C. For this display screen G3, a date on which image P for example was taken is displayed in a margin of the display screen G3.

As described above, if the user's hand approaches the stereo camera 4 to exceed the first threshold value L1 or the second threshold value L2, the CPU 11 switches display screen G1 to the display screen G2 to the display screen G3, thereby executing zoom-out display so as to display many images P from one image P.

On the other hand, if the input point is found departing from the stereo camera 4, the CPU 11 sets the first threshold value L1 and the second threshold value L2 to "80" and "170" for example, respectively, in order to change zooming ratios as shown in FIG. 6B.

If the input point departed from the stereo camera 4 beyond "170" that is the second threshold value L2, the CPU 11 sets the display area HR2, to the list display screen G0 (refer to FIG. 3), that is obtained by zooming-in from the display area HR3. Then, the CPU 11 displays the display screen G2 (refer to FIG. 4B) corresponding to the display area HR2 onto the display 2.

Also, if the input point is found departing from the stereo camera 4 beyond "80" that is the first threshold value L1, the CPU 11 sets the display area HR1, to the list display screen G0, that is obtained by further zooming-in from the display area HR2. Then, the CPU 11 displays the display screen G1 (refer to FIG. 4A) corresponding to the display area HR1 onto the display 2.

As described above, if the user's hand departs from the display 2 to exceed the second threshold value L2 or the first threshold value L1, the CPU 11 switches the display screen G3 to the display screen G2 to the display screen G1, thereby executing zoom-in display so as to display one image P from many images P.

It should be noted that, if the input point approaches "210" and departs therefrom for example, the CPU 11 displays the display screen G2 onto the display 2 because the input point does not exceed "220" set to the second threshold value L2 when the input point approaches the stereo camera 4. Then, if the input point is found departing from the stereo camera 4, the CPU 11 sets the second threshold value L2 to "170," while keeping displaying the display screen G2 onto the display 2.

As described above, the CPU 11 switches between the display screens G1, G2, and G3 to be displayed on the display 2, only when the input point has exceeded the first threshold value L1 or the second threshold value L2.

On the other hand, if the user is pointing at the right-side part of the display 2 with the display screen G2 displayed on the display 2 for example as shown in FIG. 7A, the CPU 11 detects that the pointer PT is located on the right side to the center area CA.

At this moment, the CPU 11 displays the position pointed by the user in the pointer PT, at the same time, moves the display area HR2 on the list display screen G0 in the right direction, thereby executing scroll display to move the image P displayed on the display screen G2 from the right side to the left side.

Further, if the user's hand is pointing at the left-side part of the display 2 with the display screen G2 shown on the display 2 for example as shown in FIG. 7B, the CPU 11 detects that the pointer PT is located on the left side to the center area CA.

At this moment, the CPU 11 displays the position pointed by the user in the pointer PT, at the same time, moves the display area HR2 on the list display screen G0 in the left direction, thereby executing scroll display to move the image P displayed on the display screen G2 from the left side to the right side.

It should be noted that, as described above, the television receiver 1 displays image P onto the display 2 with three steps of zooming ratios in accordance with the distance between the stereo camera 4 and an input point.

At this moment, if the user wants to carefully view image P, it is possible to set the display screen G1 in which image P5 for example is fully displayed. In this case, as the scroll speed is increased, the user cannot view image P5 carefully. Therefore, the CPU 11 scrolls image P at a low speed when the right side or the left side of the center area CA is pointed by the user with the display screen G1 shown on the display 2.

On the other hand, if the user wants to view image P in a total manner, it is possible to set the display screen G2 or G3 in which many images P are displayed at once. In this case, if the scroll speed is low, it takes a lot of time for the user to understand many images P in a total manner.

In order to overcome this problem, when the right side or the left side of the center area CA is pointed by the user with the display screen G2 shown on the display 2, the CPU 11 scrolls the image P at a medium speed that is higher than the scroll speed with the display screen G1 displayed.

Also, when the right side or the left side of the center area CA is pointed by the user with the display screen G3 shown on the display 2, the CPU 11 scrolls the image P at a high speed that is further higher than the scroll speed with the display screen G2 displayed.

As described above, when the right-side part or the left-side part of the display 2 is pointed by the user, the CPU 11 horizontally scrolls right and left the image P by changing the scroll speeds in accordance with zooming ratios of the image P displayed onto the display 2.

1-4. Image Display Processing Procedure

Figure 8:
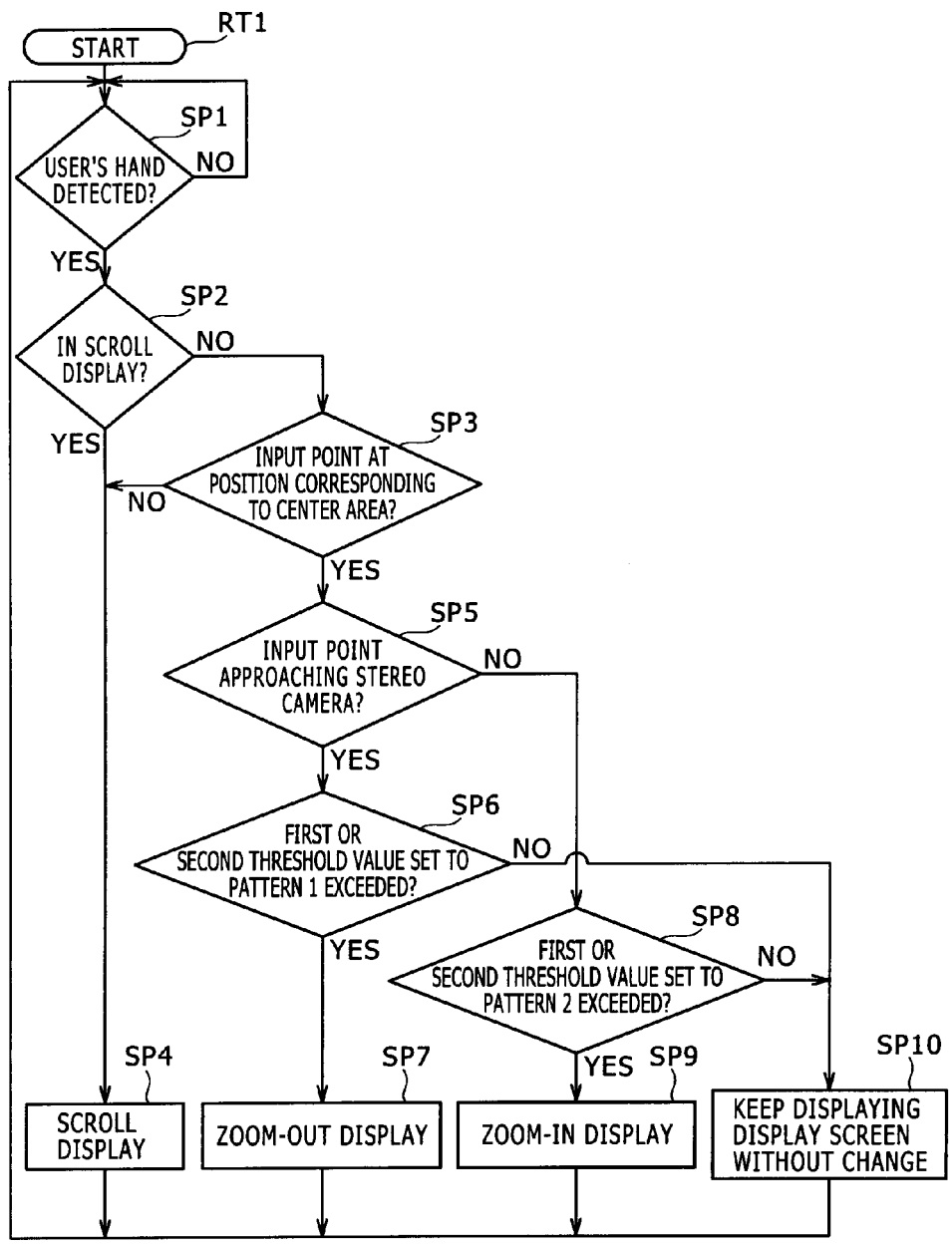
FIG. 8 is a flowchart indicative of screen display processing procedure in a first embodiment of present the invention.

The following describes in detail the above-described image display processing procedure with reference to the flowchart shown in FIG. 8. Actually, the CPU 11 enters the starting step of routine RT1 and moves to next step SP1.

In step SP1, the CPU 11 sets the display area HR1 to the list display screen G0 so as to display image P5, in a total manner, corresponding to image data that provides reference, for example, thereby displaying the display screen G1 (refer to FIG. 4A) corresponding to this display area HR1 onto the display 2.

Next, the CPU 11 executes flesh color extraction processing on video data taken by the cameras 4A and 4B of the stereo camera 4, respectively, thereby determining whether the user's hand has been detected.

If a result of the above-mentioned determination is negative, it indicates that the user's hand has not been detected, meaning that the user has not done a gesture, upon which the CPU 11 returns to step SP1 and waits until the user's hand is detected.

On the other hand, if a result of the above-mentioned determination is affirmative in step SP1, it indicates that the user has done a gesture, upon which the CPU 11 goes to next step SP2.

In step SP2, the CPU 11 determines whether image P is scroll-displayed. If a result of this determination is affirmative, the CPU 11 goes to step SP4. If a result of this determination is negative, then the CPU 11 goes to next step SP3.

In step SP3, the CPU 11 detects an input point from video data taken by the cameras 4A and 4B of the stereo camera 4, respectively, and at the same time, detects a three-dimensional position of this input point. Then, on the basis of the detected three-dimensional position of the input point, the CPU 11 determines whether this input point is at a position corresponding to the center area CA of the display 2.

If a result of this determination is negative, it means that the input point is located in either the right direction or the left direction relative to the center area CA of the display 2, which in turn means the user is pointing at either the left side or the right side of the display 2, upon which the CPU 11 goes to step SP4.

In step SP4, the CPU 11 horizontally scroll-displays the image P shown on the display 2 in accordance with the position of the input point while changing scroll speeds in accordance with a zooming ratio of the image P and then returns to step SP1.

On the other hand, if a result of the determination is affirmative in step SP3, it means that the user is pointing at the center area CA of the display 2, upon which the CPU 11 goes to next step SP5.

In step SP5, the CPU 11 obtains a difference between the distances from the stereo camera 4 to the input point that were continuously detected previously and subsequently to determine whether this input point is approaching the stereo camera 4. If a result of this determination is affirmative, then the CPU 11 goes to next step SP6.

In step SP6, the CPU 11 sets the first threshold value L1 and the second threshold value L2 to "150" and "220," respectively that belong to pattern 1 respectively, and determines whether the input point has approached beyond the first threshold value L1 or the second threshold value L2.

If a result of this determination is affirmative, it means that the input point has approached beyond the first threshold value L1 or the second threshold value L2, upon which the CPU 11 goes to next step SP7.

In step SP7, if the CPU 11 recognizes that the first threshold value L1 has been exceeded, the CPU 11 executes zoom-out display for switching the display screen G1 to the display screen G2. If the CPU 11 recognizes that the second threshold value L2 has been exceeded, the CPU 11 executes zoom-out display for switching the display screen G2 to the display screen G3. Then, the CPU 11 returns to step SP1.

On the other hand, if a result of the determination is negative in step SP5, it means that the input point is departing from the stereo camera 4, upon which CPU 11 moves to step SP8.

In step SP8, the CPU 11 sets the first threshold value L1 and the second threshold value L2 to "80" and "170," respectively that belong to pattern 2, respectively, thereby determining whether the input point has departed beyond the first threshold value L1 or the second threshold value L2.

If a result of this determination is affirmative, it means that the input point has departed beyond the first threshold value L1 or the second threshold value L2, upon which the CPU 11 goes to next step SP9.

In step SP9, if the CPU 11 recognizes that the first threshold value L1 has been exceeded, the CPU 11 executes zoom-in display for switching the display screen G2 to the display screen G1. If the CPU 11 recognizes that the second threshold value L2 has been exceeded, the CPU 11 executes zoom-in display for switching the display screen G3 to the display screen G2. Then, the CPU 11 returns to step SP1.

On the other hand, if a result of the determination is negative in step SP6 and step SP8, it means that the input point has not moved beyond the first threshold value L1 and the second threshold value L2, upon which the CPU 11 goes to next step SP10.

In step SP10, the CPU 11 continues displaying without switching between the display screens G1, G2, and G3 and returns to step SP1.

1-5. Operations and Effects

In the configuration described above, the television receiver 1 detects, as an input point, a pixel having the highest luminance level in a flesh color part corresponding to the user's hand from the video data taken by the stereo camera 4 and, at the same time, detects a three-dimensional position of this input point.

Then, if the input point is found to be at a position corresponding to the center area CA and this input point is found approaching the television receiver 1, the television receiver 1 sets the first threshold value L1 and the second threshold value L2 to pattern 1.

Next, if the input point approaches beyond the first threshold value L1 or the second threshold value L2, the television receiver 1 switches the display screen G1 to the display screen G2 or the display screen G2 to the display screen G3, thereby executing zoom-out display.

Also, if the position of the input point is found to be inside the center area CA and this input point is found departing from the television receiver 1, the television receiver 1 sets the first threshold value L1 and the second threshold value L2 to pattern 2 that is set farther than the pattern 1 relative to the stereo camera 4.

Then, if the input point has departed beyond the first threshold value L1 or the second threshold value L2, the television receiver 1 switches the display screen G2 to the display screen G1 or the display screen G3 to the display screen G2, thereby executing zoom-in display.

Therefore, if the input point approaches beyond the first threshold value L1 or the second threshold value L2, the television receiver 1 sets this first threshold value L1 or this second threshold value L2 farther from the stereo camera 4. Consequently, if the input point has once exceeded the first threshold value L1 or the second threshold value L2, the television receiver 1 is able to make it difficult for this input point to return beyond the first threshold value L1 or the second threshold value L2 again.

Now, if the user's hand exceeds the first threshold value L1 or the second threshold value L2 in approaching the television receiver 1, it is possible for the user to slightly draw his hand in reaction to the switching between the display screens G1, G2, and G3 to be displayed on the display 2.

If this happens, the television receiver 1 sets the first threshold value L1 or the second threshold value L2 farther from the stereo camera 4, so that the switching between the display screens G1, G2, and G3 in accordance with the retracted hand position can be prevented.

As described above, the television receiver 1 prevents the switching between the display screens G1, G2, and G3 caused by an unintentional movement of the user's hand, so that the ease of use is enhanced by the embodiment of the present invention.

If the position of the input point is found to be either the right or the left to the center area CA, the television receiver 1 executes scroll display of image P displayed on the display screen G1, G2, or G3 without setting the first threshold value L1 and the second threshold value L2.

Consequently, because there occurs no switching between the display screens G1, G2, and G3 during scroll display, the television receiver 1 is able to prevent the user from being perplexed by the changing of zooming ratios during scroll display.

According to the configuration described above, the television receiver 1 detects the three-dimensional position of an input point corresponding to the user's hand from the video data taken by the stereo camera 4. Then, if the input point is found coming close beyond the first threshold value L1 or the second threshold value L2 set to pattern 1, the television receiver 1 sets the first threshold value L1 or the second threshold value L2 to pattern 2 set farther than pattern 1.

Consequently, the television receiver 1 is able to prevent the easy switching between the display screens G1, G2, and G3 when the input point has exceeded the first threshold value L1 or the second threshold value L2, thereby enhancing the ease of use.

1-6. Functional Configuration of Television Receiver

The following describes a functional configuration of the television receiver 1 in the first embodiment. As shown in FIG. 9, the television receiver 1 functions as a control detection block 31 (term "control" here denotes user's hand, finger, or the like that is used for giving commands necessary for the operation of the television receiver 1), a position detection block 32, a threshold value setting block 33, a setting change block 34, and a processing execution block 35.

With the television receiver 1, the stereo camera 4 functions as the control detection block 31 and the CPU 11 functions as the position detection block 32, the threshold value setting block 33, the setting change block 34, and the processing execution block 35.

Therefore, the television receiver 1 executes the above-described image display processing on the basis of the above-described functional configuration.

2. Second Embodiment

2-1. Configuration of Television Receiver

In the second embodiment of the present invention, unlike the first embodiment, a shape of the user's hand is recognized rather than detecting an input point from video data taken by the stereo camera 4. It should be noted that a configuration of a television receiver 1 is substantially the same as the configuration of the first embodiment, so that the description of the second embodiment is skipped.

To be more specific, the CPU 11 gets the video data taken by the cameras 4A and 4B of the stereo camera 4 as time passes and at every predetermined timing and then executes flesh color extraction processing on the video data taken by the camera 4A for example.

The CPU 11 detects a flesh color part obtained by the flesh color extraction processing as an input part and, at the same time, detects a position on a plane parallel to a display 2 of this input part and a distance from the stereo camera 4 as a three-dimensional position.

In addition, if the input part is found in the video data, the CPU 11 executes a pattern matching between a shape of this input part and two or more shapes stored in a nonvolatile memory 12 beforehand.

At this moment, if the shape of the input part is found matching none of the shapes stored in the nonvolatile memory 12 as a result of the pattern matching, the CPU 11 determines that the user has not done a gesture.

On the other hand, if the shape of the input part is found matching any one of the shapes stored in the nonvolatile memory 12 as a result of the pattern matching, the CPU 11 determines that the user has done a gesture.

Then, every time getting video data taken by the cameras 4A and 4B of the stereo camera 4, the CPU 11 detects the shape and three-dimensional position of the input part, thereby detecting a change in the shape and three-dimensional position of this input part as a gesture. Next, the CPU 11 executes processing in accordance with the detected gesture.

2-2. Image Display Processing

The following describes processing in accordance with a gesture when the image data stored in the nonvolatile memory 12 is displayed on the display 2.

Executing the image display processing, the CPU 11 reads image data stored in the nonvolatile memory 12 like the first embodiment. Then, on the basis of the image taking date added to the image data, the CPU 11 generates a list display screen G0 (refer to FIG. 3) in which images P1 through P10 based on 10 sheets of image data for example are arranged at predetermined intervals from left to right in the order of image taking dates.

Then, the CPU 11 sets the display area HR1 to the list display screen G0 so as to totally display the image P5 for example, thereby displaying a display screen G1 (refer to FIG. 4A) corresponding to this display area HR1 onto the display 2.

Next, every time getting video data taken by the cameras 4A and 4B of the stereo camera 4 respectively, the CPU 11 gets an input part by executing the flesh color processing on the obtained video data, thereby detecting a three-dimensional position of this input part.

Also, for the input part obtained by executing the flesh color extraction processing, the CPU 11 executes a pattern matching between a shape of the hand with only the index finger extended (hereafter also referred to as a indicating shape) and a shape of an open hand (hereafter referred to as an open shape).

If a match is found between the input part and the indicating shape as a result of the pattern matching, the CPU 11 executes zoom display onto the display 2 for displaying the list display screen G0 with three different zooming ratios in accordance with a distance from the stereo camera 4 to the input part.

To be more specific, the CPU 11 obtains differences between the distances from the stereo camera 4 to the input part that were continuously detected previously and subsequently to determine whether this input part is approaching the stereo camera 4 or departing therefrom.

Then, if the input part is found approaching the stereo camera 4, the CPU 11 sets the first threshold value L1 and the second threshold value L2 for changing zooming ratios to "150" and "220" for example, respectively that belong to pattern 1 (refer to FIG. 6A).

Next, like the first embodiment, if the input part has approached the stereo camera 4 beyond "150" that is the first threshold value L1, the CPU 11 switches the display screen G1 to the display screen G2 (refer to FIG. 4B) and displays the display screen G2 onto the display 2.

If the input part has approached the stereo camera 4 beyond "220" that is the second threshold value L2, the CPU 11 switches the display screen G2 to the display screen G3 (refer to FIG. 4C) and displays the display screen G3 onto the display 2.

On the other hand, of the input part is found to be departing from the stereo camera 4, the CPU 11 sets the first threshold value L1 and the second threshold value L2 to "80" and "170" for example that are pattern 2 (refer to FIG. 6B) so as to change zooming ratios.

Then, like the first embodiment, if the input part has departed from the stereo camera 4 beyond "170" that is the second threshold value L2, the CPU 11 switches the display screen G3 to the display screen G2 and displays the display screen G2 onto the display 2.

In addition, if the input part is found departing from the stereo camera 4 beyond "80" that is the first threshold value L1, the CPU 11 switches the display screen G2 to the display screen G1 and displays the display screen G1 onto the display 2.

On the other hand, if the input part is found matching the open shape as a result of the pattern matching, the CPU 11 executes scroll display of image P shown on the display 2 at different scroll speeds of three steps in accordance with distances from the stereo camera 4 to the input part.

To be more specific, by obtaining a difference between distances from the stereo camera 4 to an input part continuously detected previously and subsequently, the CPU 11 determines whether this input part is approaching the stereo camera 4 or departing therefrom. Also, the CPU 11 determines whether the input part is located at the left side or the right side of the stereo camera 4.

Then, if the input part is found approaching the stereo camera 4, the CPU 11 sets the third threshold value L3 and the fourth threshold value L4 for changing scroll speeds to "150" and "220" for example that belong to pattern 3 as shown in FIG. 10A.

Next, if the input part is found not exceeding "150" that is the third threshold value L3, the CPU 11 sets the scroll speed to low speed. Then, the CPU 11 executes scroll display of the image P shown on the display screen G1, G2, or G3 (refer to FIG. 4) at low speed in the right direction or the left direction depending on the direction in which the input part is located.

Further, if the input part is found approaching the stereo camera 4 beyond "150" that is the third threshold value L3, the CPU 11 sets the scroll speed to medium speed. Then, the CPU 11 executes scroll display of the image P shown on the display screen G1, G2, or G3 (refer to FIG. 4) at medium speed in the right direction or the left direction depending on the direction in which the input part is located.

Still further, if the input part is found approaching the stereo camera 4 beyond "220" that is the fourth threshold value L4, the CPU 11 sets the scroll speed to high speed. Then, the CPU 11 executes scroll display of the image P shown on the display screen G1, G2, or G3 (refer to FIG. 4) at high speed in the right direction or the left direction depending on the direction in which the input part is located.

On the other hand, if the input part is found departing from the stereo camera 4, the CPU 11 sets the third threshold value L3 and the fourth threshold value L4 for changing scroll speeds to "80" and "170" for example, respectively that are pattern 4 as shown in FIG. 10B.

Then, if the input part is found departing from the stereo camera 4 beyond "170" that is the fourth threshold value L4, the CPU 11 sets the scroll speed to medium speed, and executes the scroll displays of image P shown on the display screen G1, G2, or G3 at medium speed in accordance with the direction in which the input part is located.

Further, if the input part is found departing from the stereo camera 4 beyond "80" that is the third threshold value L3, the CPU 11 sets the scroll speed to low speed, and executes the scroll displays of image P shown on the display screen G1, G2, or G3 at low speed in accordance with the direction in which the input part is located.

As described above, the CPU 11 displays image P while changing the zooming ratios and scroll speeds in accordance with the shape of user's hand and the three-dimensional position of user's hand.

2-3. Procedure of Image Display Processing

The following describes in detail the above-mentioned image display processing with reference to the flowchart shown in FIG. 11. Actually, the CPU 11 enters the start step of routine RT2 and goes to next step SP21.

In step SP21, the CPU 11 sets the display area HR1 to the list display screen G0 so as to totally display the image P5 for example, thereby displaying the display screen G1 (refer to FIG. 4A) corresponding to this display area HR1 onto the display 2.

Then, by executing the flesh color extraction processing on video data taken by the camera 4A of the stereo camera 4, the CPU 11 determines whether the user's hand has been detected on the basis of the existence of a flesh color part.

If a result of this determination is negative, it means that the user has not done a gesture because the user's hand has not been detected, upon which the CPU 11 returns to step SP21 to wait until the user's hand is detected.

On the other hand, if a result of the determination is affirmative in step SP21, it means that the user's hand has been detected, upon which the CPU 11 goes to next step SP22.

In step SP22, the CPU 11 executes a pattern matching between an input part obtained by the execution of the flesh color extraction procession and the indicating shapes stored in the nonvolatile memory 12, thereby determining whether there is a match between this input part and any one of the indicating shapes.

If a result of this determination is affirmative, it means that the user executes an operation for changing zooming ratios, upon which the CPU 11 goes to next step SP23.

In step SP23, the CPU 11 detects a three-dimensional position of the input part on the basis of the video data taken by the cameras 4A and 4B of the stereo camera 4, respectively.

Then, by obtaining a difference between distances from the stereo camera 4 to the input part continuously detected previously and subsequently, the CPU 11 determines whether the this input part is approaching the stereo camera 4. If a result of this determination is affirmative, the CPU 11 goes to next step SP24.

In step SP24, the CPU 11 sets the first threshold value L1 and the second threshold value L2 to "150" and "220," respectively that belong to pattern 1 and determines whether the input part has approached beyond the first threshold value L1 or the second threshold value L2.

If a result of this determination is negative, it means that the input part has not moved beyond the first threshold value L1 and the second threshold value L2, upon which the CPU 11 goes to step SP29.

On the other hand, if a result of the determination is affirmative, it means that the input part has approached beyond the first threshold value L1 or the second threshold value L2, upon which the CPU 11 goes to next step SP25.

In step SP25, if the CPU 11 recognizes that the input part has exceeded the first threshold value L1, the CPU 11 executes zoom-out display for switching the display screen G1 to the display screen G2. Further, the CPU 11 recognizes that the second threshold value L2 has been exceeded, the CPU 11 executes zoom-out display for changing the display screen G2 to the display screen G3. Then, the CPU 11 returns to step SP21.

On the other hand, if a result of the determination is negative in step SP23, it means that the input part is departing from the stereo camera 4, upon which the CPU 11 goes to step SP26.

In step S26, the CPU 11 sets the first threshold value L1 and the second threshold value L2 to "80" and "170," respectively that belong to pattern 2 and determines whether the input part has departed beyond the first threshold value L1 or the second threshold value L2.

If a result of this determination is negative, it means that the input part has not moved beyond the first threshold value L1 and the second threshold value L2, upon which the CPU 11 goes to step SP29.

On the other hand, if a result of the determination is affirmative, it means that the input part has departed beyond the first threshold value L1 or the second threshold value L2, upon which the CPU 11 goes to next step SP27.

In step SP27, if the CPU 11 recognizes that the input part has exceeded the first threshold value L1, the CPU 11 executes zoom-in display for switching the display screen G2 to the display screen G1. If the CPU 11 recognizes that the input part has exceeded the second threshold value L2, then the CPU 11 executes zoom-in display for switching the display screen G3 to the display screen G2. Then, the CPU 11 returns to step SP21.

On the other hand, if a result of the determination is negative in step SP22, the CPU 11 goes to step SP28. In step SP28, the CPU 11 executes a pattern matching between an input part obtained by the execution of the flesh color extraction processing and the open shapes stored in the nonvolatile memory 12, thereby determining whether there is a match between this input part and any one of the open shapes.

If a result of this determination is negative, it means that there is no match between the input part obtained by the execution of the flesh color extraction processing and indicating shape and any one of the open shapes, upon which the CPU 11 goes to step SP29.

In step SP29, the CPU 11 continues displaying without switching between the display screen G1, G2, or G3 shown on the display 2.

On the other hand, if a result of the determination is affirmative in step SP28, it means that the user is doing an operation for scrolling the image P, upon which the CPU 11 goes to next step SP30.

In step SP30, the CPU 11 detects a three-dimensional position of the input part on the basis of the video data taken by the cameras 4A and 4B of the stereo camera 4, respectively.

Then, by obtaining a difference between the distances from the stereo camera 4 to an input part continuously detected previously and subsequently, the CPU 11 determines whether this input part is approaching the stereo camera 4. If a result of this determination is affirmative, the CPU 11 goes to next step SP31.

In step SP31, the CPU 11 sets the third threshold value L3 and the fourth threshold value L4 to "150" and "220," respectively that belong to pattern 3 and determines whether the input part has approached beyond the third threshold value L3 or the fourth threshold value L4.

If a result of this determination is affirmative, it means that the input part has approached beyond the third threshold value L3 or the fourth threshold value L4, upon which the CPU 11 goes to step SP33. On the other hand, if a result of the determination is negative, it means that the input part has not moved beyond the third threshold value L3 and the fourth threshold value L4, upon which the CPU 11 goes to step SP34.

On the other hand, if a result of the determination is negative in step SP30, it means that the input part is departing from the stereo camera 4, upon which the CPU 11 goes to step SP32.

In step SP32, the CPU 11 sets the third threshold value L3 and the fourth threshold value L4 to "80" and "170," respectively that belong to pattern 4 and determines whether the input part has approached beyond the third threshold value L3 or the fourth threshold value L4.

If a result of this determination is affirmative, it means that the input part has departed from the stereo camera 4 beyond the third threshold value L3 or the fourth threshold value L4, upon which the CPU 11 goes to step SP33. On the other hand, if a result of the determination is negative, it means that the input part has not moved beyond the third threshold value L3 and the fourth threshold value L4, upon which the CPU 11 goes to step SP34.

In step SP33, the CPU 11 changes a scroll speed corresponding to the case where the third threshold value L3 or the fourth threshold value L4 has been exceeded and goes to next step SP35. On the other hand, in step SP34, the CPU 11 maintains the scroll speed and goes to next step S35.

In step SP35, the CPU 11 executes the scroll display of the image P shown on the display screen G1, G2, or G3 in the right direction or the left direction depending on the position of the input part at the scroll speed set in step SP34 or SP35 and then goes to step SP21.

2-4. Operations and Effects

In the configuration described above, the television receiver 1 detects, as an input part, the user's hand from the video data taken by the stereo camera 4 and then detects the shape and three-dimensional position of the detected input part.

In addition, if the shape of the input part is an indicating shape for example and if this input part is approaching the stereo camera 4, the television receiver 1 sets the first threshold value L1 and the second threshold value L2 to pattern 1.

Then, if the input part has approached beyond the first threshold value L1 or the second threshold value L2, the television receiver 1 executes zoom-out display for switching the display screen G1 to the display screen G2 or the display screen G2 to the display screen G3.

If the input part has an indicating shape for example and the input part is departing from the stereo camera 4, then the television receiver 1 sets the first threshold value L1 and the second threshold value L2 to pattern 2 set farther from the stereo camera 4 than pattern 1.

Then, if the input part has departed from the stereo camera 4 beyond the first threshold value L1 or the second threshold value L2, the television receiver 1 executes zoom-in display for switching the display screen G2 to the display screen G1 or the display screen G3 to the display screen G2.

Therefore, if the input part has approached beyond the first threshold value L1 or the second threshold value L2, the television receiver 1 sets the first threshold value L1 or the second threshold value L2 farther from the stereo camera 4. This configuration allows, once an input part has exceeded the first threshold value L1 or the second threshold value L2, the television receiver 1 to make it difficult for this input part to return beyond the first threshold value L1 or the second threshold value L2.

In addition, if the shape of an input part is found to be the open shape and this input part is found approaching the stereo camera 4, the television receiver 1 sets the third threshold value L3 and the fourth threshold value L4 to pattern 3.

Next, if an input part has approached to the stereo camera 4 beyond the third threshold value L3 or the fourth threshold value L4, the television receiver 1 executes scroll display of the image P shown on the display screen G1, G2, or G3 in the right direction or the left direction depending on the position of this input part by changing scroll speeds to a higher level.

Further, if an input part has the open shape and is departing from the stereo camera 4, then the television receiver 1 sets the third threshold value L3 and the fourth threshold value L4 to pattern 4 set farther from the stereo camera 4 than pattern 3.

Then, if an input part has departed from the stereo camera 4 beyond the third threshold value L3 or the fourth threshold value L4, the television receiver 1 executes scroll display of the image P shown on the display screen G1, G2, or G3 in the right direction or the left direction depending on the position of this input part by changing scroll speeds to a lower level.

Therefore, if an input part has approached the stereo camera 4 beyond the third threshold value L3 or the fourth threshold value L4, the television receiver 1 sets the third threshold value L3 or the fourth threshold value L4 farther from the stereo camera 4. This configuration allows, once an input part has exceeded the third threshold value L3 or the fourth threshold value L4, the television receiver 1 to make it difficult for this input part to return beyond the third threshold value L3 or the fourth threshold value L4.

Consequently, the television receiver 1 is able to make it easy for a display form to continue that is displayed when an input part has exceeded the first threshold value L1, the second threshold value L2, the third threshold value L3, or the fourth threshold value L4.

In addition, the television receiver 1 switches between the first threshold value L1 and the second threshold value L2 and between the third threshold value L3 and the fourth threshold value L4 depending on the shape of each input part. This configuration allows the setting of a threshold value at distances different between zoom display and scroll display, for example.

According to the configuration described above, the television receiver 1 detects the shape and three-dimensional position of each input part corresponding to the user's hand from video data taken by the stereo camera 4. Next, if an input part has approached the stereo camera 4 beyond a threshold value set to pattern 1 or pattern 3 in accordance with the shape of this input part, the television receiver 1 sets a threshold value to pattern 2 or pattern 4 set farther than pattern 1 or pattern 3.

Consequently, the television receiver 1 is able to prevent the easy changing of display forms shown when an input part has exceeded a threshold value, thereby enhancing the ease of use.

3. Other Embodiments

3-1. Other Embodiment 1

It should be noted that, in the first and second embodiments of the present invention described above, a three-dimensional position of the user's hand is detected from video data taken by the stereo camera 4.

However, the embodiments of the present invention are not limited to the above-mentioned configuration. For example, a three-dimensional position of the user's hand may be detected by use of proximity sensors of inductive type, electrostatic capacitance type, ultrasonic type, electromagnetic wave type, infrared ray type, and so on.

3-2. Other Embodiment 2

Further, in the first and second embodiments of the present invention described above, a three-dimensional position of the user's hand is detected. However, the embodiments of the present invention are not limited to this configuration. For example, a three-dimensional position of a remote controller for example may be detected.

3-3. Other Embodiment 3

Still further, in the first and second embodiments of the present invention described above, if the first threshold value L1 or the second threshold value L2 has been exceeded, image P is displayed in a zoom-in manner or a zoom-out manner. However, the embodiments of the present invention are not limited to this configuration. For example, if the first threshold value L1 or second threshold value L2 has been exceeded, any processing may be applied in the case where the settings for predetermined processing, such as changing the volume and switching channels, for example, are changed.

Likewise, in the first and second embodiments of the present invention described above, when the right side or the left side of the display 2 is pointed or the shape of an input part is an open shape, the image P shown on the display 2 is horizontally scroll-displayed. However, the embodiments of the present invention are not limited to this configuration. For example, any processing may be applied in the case where the settings for predetermined processing are changed.

3-4. Other Embodiment 4

Yet further, in the second embodiment of the present invention, if the shape of an input part is an indicating shape, the first threshold value L1 and the second threshold value L2 are used; if the shape of an input part is an open shape, the third threshold value L3 and the fourth threshold value L4 are used.

However, the embodiments of the present invention are not limited to this configuration. For example, in the case where the shape of an input part is an indicating shape and the shape of an input part is an open shape, the first threshold value L1 and the second threshold value L2, for example that are the same threshold value may be used.

3-5. Other Embodiment 5

Besides, in the first and second embodiments of the present invention described above, the first threshold value L1 and the second threshold value L2 are provided such that zooming ratios are changed in three steps for example.

However, the embodiments of the present invention are not limited to this configuration. For example, zooming ratios may be changed in five steps or four threshold values set to different values may be provided regardless of the number of threshold values.

3-6. Other Embodiment 6

In addition, in the first and second embodiments of the present invention described above, if the user's hand approaches the stereo camera 4 beyond the second threshold value L2, the display screen G3 is shown on the display 2.

Figure 12A:
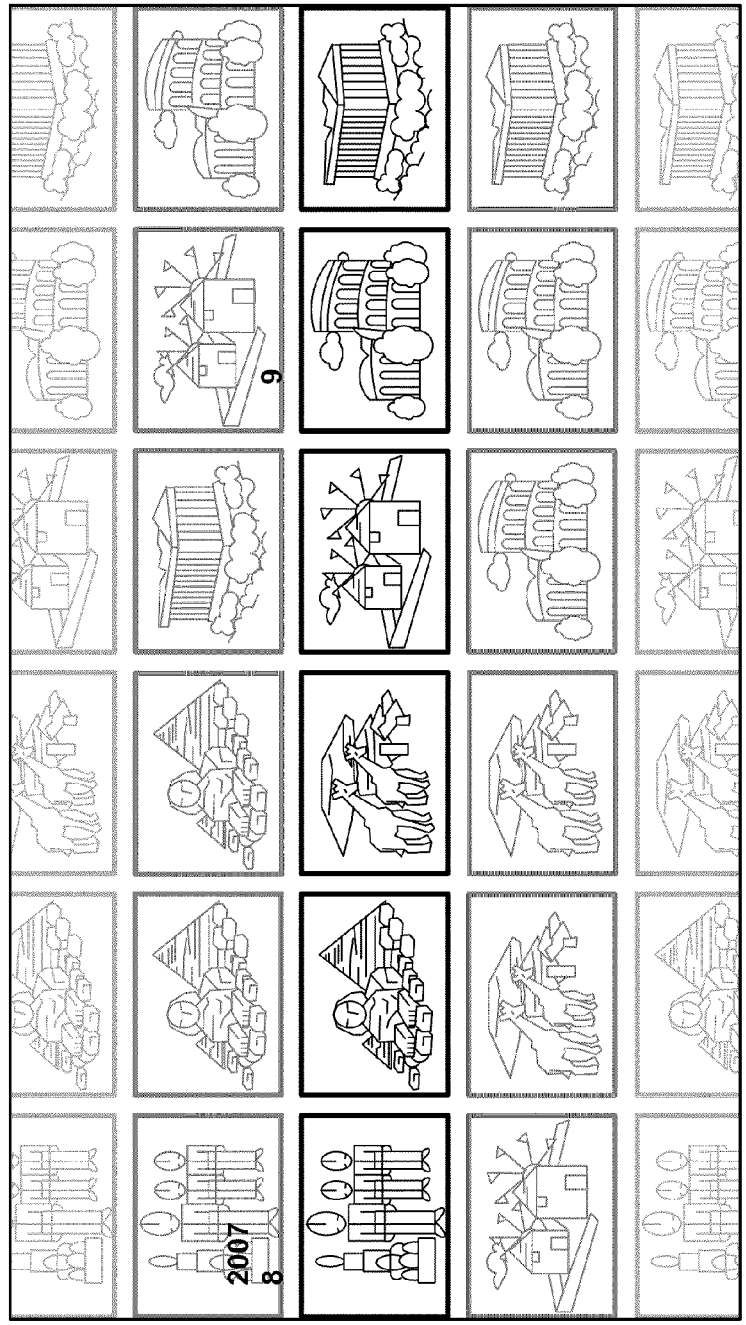
FIGS. 12A, 12B, and 12C are diagrams illustrating exemplary display screens in other embodiments.

However, the embodiments of the present invention are not limited to this configuration. For example, if the user's hand has approached beyond the second threshold value L2, an image G4 may be shown on the display 2 as shown in FIG. 12A.

This image G4 is displayed upper and lower of the images P3 through P7 on the display screen G2; to be more specific, for example, images near in taking date to these images P3 through P7 or images taken in a same area are displayed with the transparency of these images increased in the up down directions.

3-7. Other Embodiment 7

Further, in the first and second embodiments of the present invention described above, if an input point or an input part has approached the stereo camera 4 beyond the second threshold value L2, the display screen G3 is shown on the display 2.

Figure 12B:
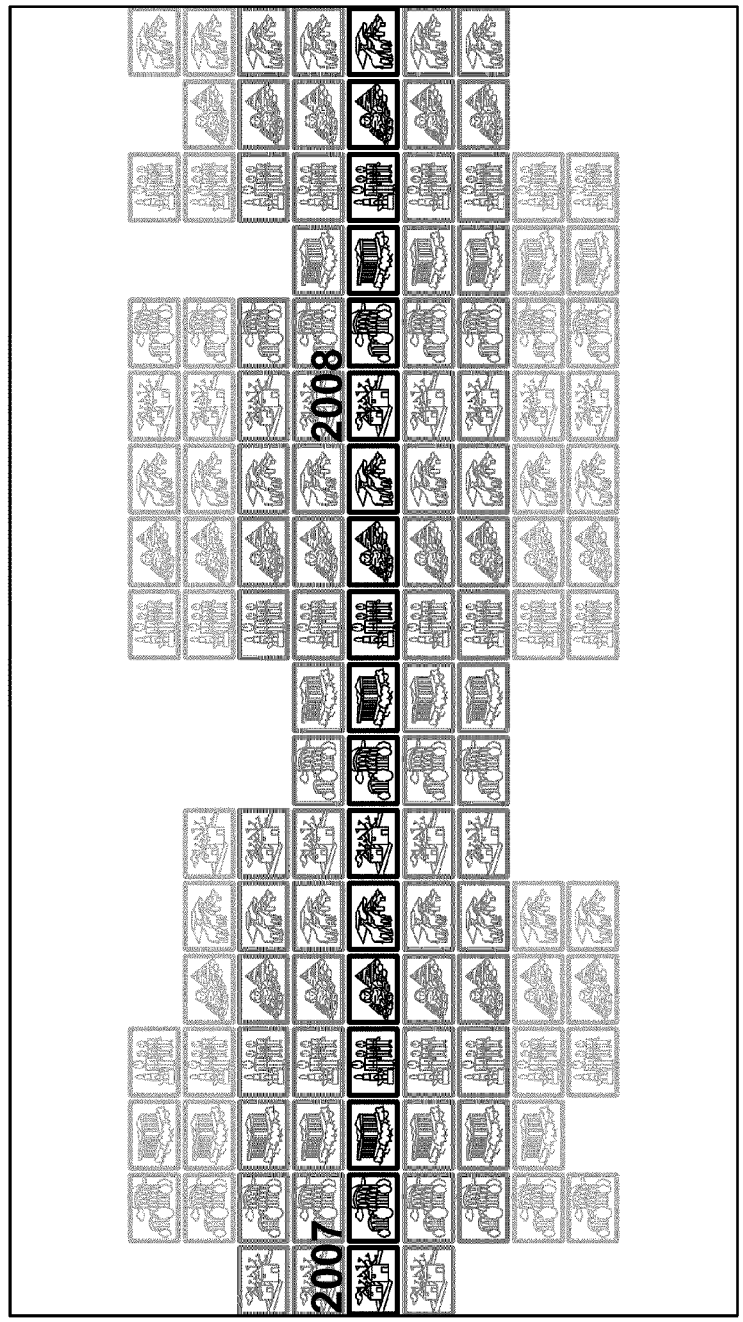
Figure 12C:
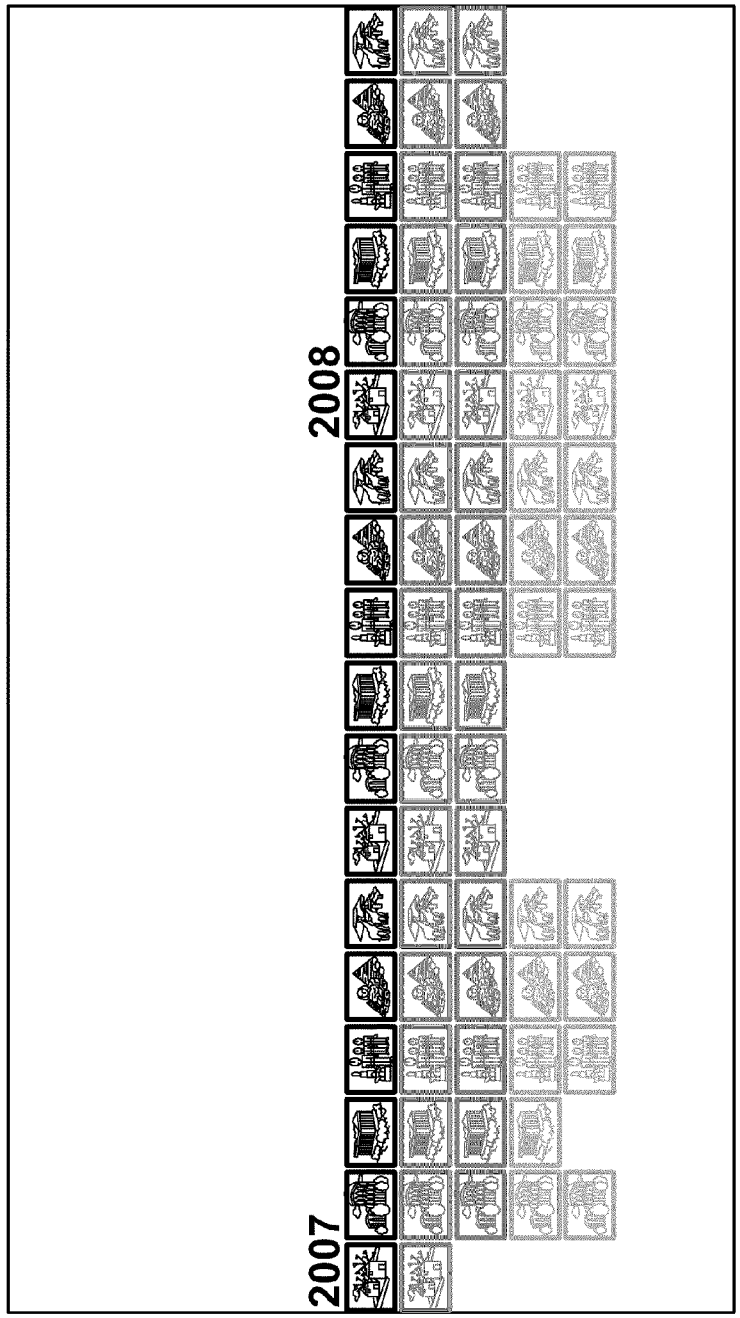

However, the embodiments of the present invention are not limited to this configuration. For example, if an input point or an input part has approached the stereo camera 4 beyond the second threshold value L2, an image G5 or an image G6 may be shown on the display 2 as shown in FIGS. 12B and 12C.

This image G5 displays more images P than that on the display screen G3. The image G5 is displayed upper and lower of the images P displayed on the image G4; to be more specific, for example, images near in taking date to these images P or images taken in a same area are displayed with the transparency of these images increased in the up and down direction. The image G6 is displayed lower of the images P displayed on the image G5; to be more specific, for example, images near in taking date to these images P or images taken in a same area are displayed with the transparency of these images increased in the down direction.

Also, the images G4, G5, and G6 are displayed in a zoom-out manner further than the image G3, so that the year in which image P was taken is displayed on the margins for example of these images G4, G5, and G6.

3-8. Other Embodiment 8

Further, in the first and second embodiments of the present invention described above, if an input point or an input part has approached the stereo camera 4 beyond the first threshold value L1 for example and then depart from the stereo camera 4, the first threshold value L1 is set from pattern 1 to pattern 2.

However, the embodiments of the present invention are not limited to this configuration. For example, if an input point or an input part has approached the stereo camera 4 beyond the first threshold value L1, this first threshold value L1 may be set from pattern 1 to pattern 2 as soon as the first threshold value L1 has been exceeded.

3-9. Other Embodiment 9

In addition, in the first and second embodiments of the present invention descried above, "150" is set in pattern 1 and "70" is set in pattern 2, for example.

However, the embodiments of the present invention are not limited to this configuration. For example, if an input point or an input part departs from the stereo camera 4, as compared with approaching, the first threshold value L1 may be set at a position farther from at least a position at which the user retracts his hand by being perplexed by the switching between the display screens G1, G2, and G3. This holds true with the second threshold value L2, third threshold value L3, and the fourth threshold value L4.

3-10. Other Embodiment 10

Still further, in the first and second embodiments of the present invention described above, the CPU 11 executes the image display processing described above by following the image display processing program stored in the nonvolatile memory 12. However, the embodiments of the present invention are not limited to this configuration. For example, the above-described image display processing may be executed by an image display processing program installed from a storage media into the nonvolatile memory 12 or loaded from the Internet into the nonvolatile memory 12. The image display processing described above may also be executed as instructed by an image display processing program installed through various routes in addition to those mentioned above.

3-11. Other Embodiment 11

Yet further, in the first and second embodiments of the present invention described above, the stereo camera 4 is arranged as the control detection block. However, in the embodiments of the present invention, a control detection block based on any of various other configurations may be arranged.

Moreover, in the first and second embodiments of the present invention described above, the CPU 11 is arranged as the position detection block. However, in the embodiments of the present invention, a position detection block based on any of various other configurations may be arranged.

In addition, in the first and second embodiments of the present invention, the CPU 11 is arranged as the threshold value setting block. However, in the embodiments of the present invention, a threshold value setting block based on any of various other configurations may be arranged.

Besides, in the first and second embodiments of the present invention, the CPU 11 is arranged as the setting change block. However, in the embodiments of the present invention, a setting change block based on any of various other configurations may be arranged.

Further, in the first and second embodiments of the present invention, the CPU 11 is arranged as the processing execution block. However, in the embodiments of the present invention, a processing execution block based on any of various other configurations may be arranged.

Embodiments of the present invention are applicable to any of information processing apparatuses, such as mobile phones, in addition to television receivers.

The present application contains subject matter related to that disclosed in Japanese Priority Patent Application JP 2009-098229 filed with the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a non-volatile memory;
   a control detection circuitry configured to detect an object in a predetermined detection space;
   a position detection circuitry configured to detect a three-dimensional position of the object detected by the control detection circuitry;
   a threshold value setting unit configured, if the object has approached the control detection circuitry such that a distance between the object and the control detection circuitry, on the basis of a three-dimensional position detected by the position detection circuitry, is less than a threshold value set to a predetermined value representing a first distance between a first threshold position in the predetermined detection space and the control detection circuitry, to set the threshold value to a value representing a second distance between a second threshold position in the predetermined detection space and the control detection circuitry, the second distance being greater than the first distance;
   a setting change unit configured, if the object has approached the control detection circuitry such that the distance between the object and the control detection circuitry is less than the threshold value set by the threshold value setting unit, or if the object has departed from the control detection circuitry such that the distance between the object and the control detection circuitry is greater than the threshold value set by the threshold value setting unit, to change setting values for predetermined processing; and
   a processing execution unit configured to execute the processing by use of the setting values set by the setting change unit.

2. The information processing apparatus according to claim 1, wherein the object has approached the control detection circuitry such that the distance between the object and the control detection circuitry is less than the threshold value set to the predetermined value representing the first distance between the first threshold position in the predetermined detection space and the control detection circuitry, and then departs from the control detection circuitry, the threshold value setting unit sets the threshold value to a value representing a third distance between a third threshold position in the predetermined detection space and the control detection circuitry, the third distance being greater than the first distance.

3. The information processing apparatus according to claim 2, wherein
   the execution processing unit executes, from among a plurality of processing operations, processing in accordance with the three-dimensional position of the object detected by the position detection circuitry, and
   the threshold value setting unit sets the threshold value for each processing to be executed by the processing execution unit.

4. The information processing apparatus according to claim 3, further comprising
   a shape detection circuitry configured to detect a shape of the object detected by the control detection circuitry, wherein
   the processing execution unit executes processing in accordance with a shape of the object detected by the shape detection circuitry.

5. An information processing method executed by an apparatus having a non-volatile memory, the method comprising the steps of:
   detecting an object in a predetermined detection space;
   detecting a three-dimensional position of the object detected by the control detection step;
   setting, if the object has approached a control detection circuitry such that a distance between the object and the control detection circuitry, on the basis of a three-dimensional position detected by the position detection step, is less than a threshold value set to a predetermined value representing a first distance between a first threshold position in the predetermined detection space and the control detection circuitry, the threshold value to a value representing a second distance between a second threshold position in the predetermined detection space and the control detection circuitry, the second distance being greater than the first distance;

changing, if the object has approached the control detection circuitry such that the distance between the object and the control detection circuitry is less than the threshold value set by the threshold value setting step, or if the object has departed from the control detection circuitry such that the distance between the object and the control detection circuitry is greater than the threshold value set by the threshold value setting step, setting values for predetermined processing; and executing the processing by use of the setting values set by the setting change step.

6. An information processing program stored in a non-volatile memory, the program configured to make a computer execute the steps of:

detecting an object in a predetermined detection space;

detecting a three-dimensional position of the object detected by the control detection step;

setting, if the object has approached a control detection circuitry such that a distance between the object and the control detection circuitry, on the basis of a three-dimensional position detected by the position detection step, is less than a threshold value set to a predetermined value representing a first distance between a first threshold position in the predetermined detection space and the control detection circuitry, the threshold value to a value representing a second distance between a second threshold position in the predetermined detection space and the control detection circuitry, the second distance being greater than the first distance;

changing, if the object has approached the control detection circuitry such that the distance between the object and the control detection circuitry is less than the threshold value set by the threshold value setting step, or if the object has departed from the control detection circuitry such that the distance between the object and the control detection circuitry is greater than the threshold value set by the threshold value setting step, setting values for predetermined processing; and executing the processing by use of the setting values set by the setting change step.

7. An information processing apparatus comprising:

control detection means for detecting an object in a predetermined detection space;

position detection means for detecting a three-dimensional position of the object detected by the control detection means;

threshold value setting means for, if the object has approached the control detection means such that a distance between the object and the control detection means, on the basis of a three-dimensional position detected by the position detection means, is less than a threshold value set to a predetermined value representing a first distance between a first threshold position in the predetermined detection space and the control detection means, setting the threshold value to a value representing a second distance between a second threshold position in the predetermined detection space and the control detection circuitry, the second distance being greater than the first distance;

setting change means for, if the object has approached the control detection means such that the distance between the object and the control detection means is less than the threshold value set by the threshold value setting means, or if the object has departed from the control detection means such that the distance between the object and the control detection means is greater than the threshold value set by the threshold value setting means, changing setting values for predetermined processing; and processing execution means for executing the processing by use of the setting values set by the setting change means.

* * * * *